(12) United States Patent
De Wergifosse et al.

(10) Patent No.: US 11,415,061 B2
(45) Date of Patent: Aug. 16, 2022

(54) POWER DISTRIBUTION DEVICE BETWEEN AN ELECTRIC STARTER AND AN ELECTRIC MACHINE TOWARDS A SHAFT OF A TURBOMACHINE

(71) Applicant: SAFRAN AIRCRAFT ENGINES, Paris (FR)

(72) Inventors: Huguette De Wergifosse, Moissy-Cramayel (FR); Nicolas Bertrand Georges De Blois, Moissy-Cramayel (FR); Clement Dupays, Moissy-Cramayel (FR); Pierre Gerard Lalonde, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 194 days.

(21) Appl. No.: 16/937,369

(22) Filed: Jul. 23, 2020

(65) Prior Publication Data

US 2021/0025334 A1    Jan. 28, 2021

(30) Foreign Application Priority Data

Jul. 26, 2019    (FR) ...................................... 1908562

(51) Int. Cl.
*F02C 7/275*    (2006.01)
*B60K 6/36*    (2007.10)
(Continued)

(52) U.S. Cl.
CPC ................ *F02C 7/275* (2013.01); *B60K 6/36* (2013.01); *B60W 10/10* (2013.01); *B60K 6/485* (2013.01);
(Continued)

(58) Field of Classification Search
CPC ........... F02C 7/275; B60K 6/36; B60K 6/485; F02N 11/006; B60W 10/10;
(Continued)

(56) References Cited

U.S. PATENT DOCUMENTS

| | | | | |
|---|---|---|---|---|
| 4,588,040 A | * | 5/1986 | Albright, Jr. ............ | B60K 6/30 903/910 |
| 5,755,303 A | * | 5/1998 | Yamamoto ............ | B60W 20/00 477/3 |

(Continued)

FOREIGN PATENT DOCUMENTS

| | | | | |
|---|---|---|---|---|
| EP | 3211201 A1 | * | 8/2017 | ............. F01D 15/08 |
| EP | 3382183 A1 | | 10/2018 | |

(Continued)

OTHER PUBLICATIONS

Preliminary Research Report received for French Application No. 1908562, dated Mar. 16, 2020, 5 pages (1 page of French Translation Cover Sheet and 4 pages of original document).

*Primary Examiner* — Pedro J Cuevas
(74) *Attorney, Agent, or Firm* — Womble Bond Dickinson (US) LLP

(57) ABSTRACT

A power distribution device between an electric starter of a turbomachine and an electric machine toward a shaft of the turbomachine, including the electric starter, the electric machine, and a controller for controlling the electric machine. An epicyclic train reducer includes a first element intended to be coupled to the shaft, a second element coupled to the electric starter, and a third element intended to be rotated by the electric machine. The controller is configured to rotate the third of the three elements so as to obtain two bearings of reduction ratios of the speeds between the first of said three elements and the second of the three elements. The controller is configured to drive the (Continued)

torque of the third of the three elements in accordance with a determined output torque.

7 Claims, 6 Drawing Sheets

(51) Int. Cl.
*B60W 10/10* (2012.01)
*F02N 11/00* (2006.01)
*B60K 6/485* (2007.10)

(52) U.S. Cl.
CPC ...... *F02N 11/006* (2013.01); *F05D 2220/323* (2013.01); *F05D 2260/40311* (2013.01); *F05D 2260/85* (2013.01)

(58) Field of Classification Search
CPC ..... F05D 2220/323; F05D 2260/40311; F05D 2260/85; Y02T 50/60
See application file for complete search history.

(56) References Cited

U.S. PATENT DOCUMENTS

| | | | | |
|---|---|---|---|---|
| 6,109,127 A * | 8/2000 | Liau | ........................ | B60K 6/383 474/33 |
| 6,659,910 B2 * | 12/2003 | Gu | ........................ | B60K 6/442 474/18 |
| 7,128,671 B2 * | 10/2006 | Gu | ........................ | B60K 6/485 477/6 |
| 8,261,550 B2 * | 9/2012 | Sartre | ........................ | F01N 5/04 60/624 |
| 8,397,501 B2 * | 3/2013 | Barker | ................ | B60L 15/2054 475/5 |
| 10,273,883 B2 * | 4/2019 | Roach | ..................... | F02C 7/268 |
| 10,384,525 B2 * | 8/2019 | Franke | ..................... | F02G 5/00 |
| 10,570,816 B2 * | 2/2020 | Thomassin | ............. | F02B 53/14 |
| 10,851,714 B2 * | 12/2020 | Roach | ..................... | F01D 15/08 |
| 11,060,449 B2 * | 7/2021 | Spierling | ................ | F16H 3/728 |
| 2003/0092529 A1 * | 5/2003 | Gu | ........................ | B60K 6/543 180/65.23 |
| 2003/0098188 A1 * | 5/2003 | Gu | ........................ | B60K 6/485 180/68.5 |
| 2004/0238245 A1 * | 12/2004 | Gu | ........................ | B60K 6/485 180/65.25 |
| 2010/0044127 A1 * | 2/2010 | Sartre | ................... | B60W 20/30 180/65.21 |
| 2010/0186725 A1 * | 7/2010 | Barker | ..................... | F02B 39/10 123/559.3 |
| 2011/0281679 A1 * | 11/2011 | Larrabee | ................ | B64D 27/04 903/910 |
| 2012/0201657 A1 * | 8/2012 | Donnelly | .................. | F02C 6/20 415/123 |
| 2018/0372200 A1 * | 12/2018 | Kumar | ................... | B60K 6/442 |
| 2019/0100094 A1 * | 4/2019 | Alonso | ..................... | B60K 6/26 |
| 2019/0257249 A1 * | 8/2019 | Roach | ..................... | F02C 7/268 |
| 2020/0361302 A1 * | 11/2020 | Alonso | ................... | B60K 6/365 |
| 2021/0102499 A1 * | 4/2021 | Leque | ....................... | F02C 7/36 |

FOREIGN PATENT DOCUMENTS

| | | | | |
|---|---|---|---|---|
| EP | 3800342 A1 * | 4/2021 | ............... | F02C 7/32 |
| FR | 3062423 A1 | 8/2018 | | |
| FR | 3062424 A1 | 8/2018 | | |
| WO | 2018/138428 A1 | 8/2018 | | |

* cited by examiner

POWER DISTRIBUTION DEVICE BETWEEN AN ELECTRIC STARTER AND AN ELECTRIC MACHINE TOWARDS A SHAFT OF A TURBOMACHINE

TECHNICAL FIELD

The invention relates to the field of turbomachines, and more precisely to a power distribution device between an electric starter and an electric machine to a shaft of the turbomachine. The invention also relates to a method of regulating the speed of the electric starter of the power distribution device.

BACKGROUND

The background comprises in particular EP 3 382 183 A1.

Aircraft turbomachines, especially turbojet engines, are usually equipped with a starter.

The starter may be a hydraulic starter. However, at present, the failure rate of hydraulic starters is less than $10^{-4}$. This high failure rate is mainly due to the lack of robustness of the disengaging system.

The starter may be a pneumatic starter. A pneumatic starter can deliver a high torque during the ground starting phase and during the assistance phase of the turbomachine in flight.

FIG. 1 shows a pneumatic starter for a turbomachine. The pneumatic starter 10 consists of a turbine 12 supplied with pressurized air, represented by arrow A1, by an auxiliary power unit (APU) of the turbomachine, or by a motor, or by a device external to the aircraft. The turbine 12 ejects the air, shown by the arrow A2, at ambient pressure. The pneumatic starter 10 also comprises a reduction gear 14 allowing the starter shaft to rotate at a lower speed than the turbine 12, and a clutch 16 allowing to disengage the starter shaft 18 from the engine above a certain high-pressure rpm.

The pneumatic starter 10 is connected to the high pressure shaft 20 of the engine 26 via the accessory gear box 22 (AGB), and particularly via the gears 24 of the accessory gear box 22 with a specific reduction ratio.

The characteristic of a pneumatic starter between its torque and its speed is a linear decreasing straight line with a small slope, whose torque at zero speed can reach a significant value.

The starter torque is used to overcome the overall value of the torques at the high-pressure shaft coming from both the turbomachine, noted Cmot, and from all accessories driven through a mechanical transmission by the turbomachine, noted Caccess, during the starting phase where only the starter provides the torque, and from the engine ignition where both the starter and the engine provide an engine torque.

The power provided by the starter contributes to shortening the starting time, which must respect a maximum time specified by the aircraft manufacturer.

This starter torque, noted Cdem, makes it possible to comply with a speed time profile, noted N, with an overall inertia, noted I, brought back to the shaft of the turbomachine. The majority of resistive torques, such as the friction torques or viscous torques, evolve as a function of speed. It is therefore important to control the evolution of these resistive curves for the most critical operating conditions in terms of temperature and altitude.

FIG. 2 shows a graph illustrating the speed of the high-pressure shaft of the turbomachine, noted NHP, as a function of time, noted t. On this graph, the curve m represents a model curve, i.e. a desired curve for speed of the high-pressure shaft versus time; and the curve r represents an actual curve, also called a test curve, for the speed of the high-pressure shaft versus time.

The torques of the turbomachine are related by the following relationship:

$$Cdem = Cmot + Caccess + I * \frac{dN}{dt} \qquad [\text{Math 1}]$$

where Cdem is the torque of the starter, Cmot is the torque of the turbomachine, Caccess is the torque of the accessories of the turbomachine, I is the overall inertia brought back to the shaft of the turbomachine and dN/dt is the derivative of the speed of the shaft of the turbomachine.

The sum of the torques Cmot and Caccess corresponds to the torque to be overcome at the high-pressure shaft.

When the turbine 12 is at standstill, the engine torque is purely resistive. At approximately 20% of the speed of the high-pressure shaft 20, the turbine 12 is switched on and running. In FIG. 2, area A corresponds to the time period when only the starter is in operation. This zone A extends from a zero speed of the high pressure shaft to an engine ignition speed, noted N_ignition. The turbomachine is autonomous when the overall value of the torques Cmot and Caccess becomes zero and the acceleration is produced solely by the torque of the starter.

The zone B corresponds to the period of time when the starter and the engine are running at the same time. This zone B extends between the speed N_ignition and the speed of the engine at idle, noted N_idle. The FIG. 3 shows a graph of the torque on the high pressure shaft, noted CHP, as a function of the speed of the high pressure shaft, noted v, during a starting. On this graph, the curve a represents the torque supplied by the engine; the curve b represents the torque supplied by the starter; and the curve c represents the torque imbalance, i.e. I*dN/dt. On this graph, the point P1 indicates ignition of the engine, the point P2 indicates the autonomy of the turbomachine, the point P3 indicates the starter cut-off and the point P4 indicates the engine rpm at idle.

For cold starting, at the beginning of the starting phase, the resistive curve a reaches high values related to viscous friction, which implies a need for high starting torque at low speed. A pneumatic starter has a characteristic which allows high torques to be reached at low speed, but such a characteristic curve is detrimental in terms of mass for an electric starter.

As the mass of a starter is proportional to the maximum torque, it would be beneficial at low rpm of the turbomachine to drive the starter at the highest possible speed. However, this high speed of the starter at low rpm of the turbomachine is limited if one takes into account the maximum speed that the starter can accept at the high rpm of the turbomachine. Indeed, the speed variation range of the turbomachine is too wide.

Therefore, there is a need for a device to achieve a high variable speed reduction ratio at low rpm and a lower one at high speeds in order not to exceed the maximum speed of the starter. The device therefore offers a different ratio at high and low speeds without any additional power consumption. With the exception of efficiency, the input power corresponds to the output power.

In addition, in the turbomachines, the phenomenon of "bowed rotor" may occur. This type of phenomenon is linked to the significant thermal gradient present after the engine of the turbomachine is shut down on the ground.

The FIGS. 10a and 10b illustrate the bowed rotor phenomenon. These figures represent an engine of a turbomachine, comprising a combustion chamber 3, a low-pressure body having a low-pressure compressor 1 and a low-pressure turbine 5, and a high-pressure body having a high-pressure compressor 2 and a high-pressure turbine 4. The high-pressure compressor 2 and the high-pressure turbine 4 are rotated by a high-pressure shaft 6, which is held in position by bearings 7a, 7b arranged at each end of the latter. In FIGS. 10a and 10b, the engine of the turbomachine is stationary. The upper part 8a of the engine is hotter than the lower part 8b of the engine, causing the high-pressure shaft 6 to bow due to the differences in expansion between the upper part 8a of the engine and the lower part 8b of the engine. FIG. 10b shows the high pressure shaft 6 arched between the bearings 7a, 7b.

The impacts of the bowed rotor phenomenon are detrimental to the service life of the high pressure shaft rotor. Indeed, this phenomenon causes friction, vibration, and even blockage of the high pressure shaft.

Currently, this phenomenon imposes quite long waiting times between two restarts of the turbomachine, as well as forced dry ventilation procedures.

To counteract this type of phenomenon, it has been proposed to drive the rotor of the high-pressure shaft at very low speed after the engine of the turbomachine has been stopped, for a period of time that may exceed 1 hour depending on the temperature, in order to distribute the temperature gradient homogeneously over the entire rotor and thus avoid the problem of deformation. For this type of requirement, a long duration and low speed control must be implemented to ensure the homogeneous distribution.

However, this cannot be achieved by means of a pneumatic starter which performs its task over a very limited period of time and without speed control.

It is possible to replace the pneumatic starter with an electric starter. This is because the drive function can be carried out by means of the electric starter, which is a torque/speed-controlled electric machine.

However, an electric starter is dimensioned to operate over a very limited period to of time and to transmit a high torque, the so-called breakaway torque, only for a specific time. The electric starter is therefore not compatible with the long duration, high torque and low speed constraints imposed by the function against the bowed rotor phenomenon.

Therefore, there is a need for a solution to reduce the torque to be transmitted to the rotor of the high pressure shaft via the electric starter.

In addition, in a turbomachine, there is a need to drive the rotor of the high-pressure shaft at a sufficiently high speed to pressurize the hydraulic circuit of the control system of the turbomachine, while at the same time countering the torque induced by the injection of water into the engine. This is better known as "engine washing". This is essential for engine service life aspects.

There is also a need to achieve a low speed drive with high torque over a long period of time, using the electric starter.

The purpose of the invention is to provide a solution to meet the above needs and to address at least some of the above disadvantages.

SUMMARY OF THE INVENTION

In particular, the present invention offers a solution without additional power integrating a transmission with two operating modes in order to obtain a totally different reduction ratio between the speed of the turbomachine and the input speed of the starter at low rpm (constant high reduction ratio) and at high rpm of the turbomachine (constant lower reduction ratio or decreasing variable reduction ratio). The input power of this device corresponds to the output power. This device integrates a differential with an electric starter as a first input, an electric machine as a second input and the turbomachine as an output. This device operates in a first mode as a fixed speed ratio reducer with the electric starter on one input and the turbomachine on one output, the second input being blocked. The input power of the starter is fully transmitted to the shaft of the turbomachine. In a second mode, this device operates as a power distribution differential with modulation of the speed of the starter by driving the speed of the electric machine. As the speed of the turbomachine increases, the speed ratio between the starter and the turbomachine is reduced by increasing the speed of the electric machine to limit the maximum speed of the electric starter. In a differential, for an output speed of the turbomachine, the input speed of the starter can be controlled by modulating the speed of the electric machine. On the other hand, for a output torque of the turbomachine, the input torque of the starter cannot be controlled because there is an invariant relationship between the input torques and the output torque of the electric machine. To achieve the output torque at the turbomachine, the torque distribution between the starter and the electric machine is therefore defined by the invariant laws of the differential. With these torque laws and the driving of the speed of the starter, the input power distribution between the starter and the electric machine is determined. The sum of the input powers will be returned as output power.

For this purpose, the invention relates to a power distribution device between an electric starter of a turbomachine and an electric machine toward a shaft of the turbomachine, comprising:

the electric starter,
the electric machine,
means for controlling the speed of said electric machine,
an epicyclic train reducer comprising three elements, a central sun gear, an outer ring gear and a planet carrier whose planet gears mesh with said sun gear and said ring gear, said three elements being rotatable about an axis of the reducer, a first of said three elements being intended to be coupled to the shaft of the turbomachine, a second of said three elements being coupled to the electric starter, a third of said three elements being intended to be driven in rotation by the electric machine.

Wherein the controlling means are configured to rotate the third of said three elements so as to obtain two bearings of reduction ratios of the speeds between the first of said three elements and the second of said three elements, and wherein the controlling means are configured to drive the torque of the third of the said three elements in accordance with the determined output torque.

The torque of the starter is deduced from the output torque and the invariant law of the differential torques. The determined output torque is the output torque to be achieved.

Thanks to this device, the starter torque is maintained at a low value at low rpm of the turbomachine while not exceeding the maximum permissible speed of the starter at high rpm of the turbomachine.

This device does not require any additional power, as the sum of the input power is equal to the output power.

The wide range of torque and speed variation imposed by the operating range, and especially the high torques at low speeds, lead to electric starters of significant size.

The size of an electric machine is mainly conditioned by the maximum torque, noted Cdnnax, to be delivered. The reduction of the maximum torque implies a high reduction ratio between the output shaft of the turbomachine and the electric starter. As the electric starter is generally only cut off at about 50% of the maximum speed of the turbomachine, i.e. about 10,000 rpm, a high reduction ratio results in a maximum speed of the electric starter that exceeds the technological limits. It is therefore important to maintain this torque ratio at low speeds and to achieve a lower speed ratio at high rpm to reduce the maximum speed of the starter.

With this maximum speed constraint of the electric starter and a mass, noted M, constrained by the available volume, the maximum torque, noted Cmax, of the accessory gear box delivered does not exceed a certain threshold.

Advantageously, the device according to the invention makes it possible to set two reduction ratios between the speed of the electric starter and the speed at the turbomachine. Thus, a high ratio at low rpm and a low ratio at high rpm can be achieved without exceeding a given electrical input power.

According to the invention, the reducer couples the electric starter to the output shaft of the turbomachine. The two-input reducer is also coupled to the electric machine. The constant input power is distributed between the electric starter and the electric machine according to the flying points in order to develop a higher torque profile at the shaft of the turbomachine at low rpm. An increase in torque at low rpm ensures an acceleration potential at the ignition and ensures to maintain this acceleration for as long as possible.

Advantageously, according to the invention, there is no need for a decoupling system, clutch or brake system, contrary to the prior art. The increase in torque of about 40% at low rpm is achieved without increasing the mass of the electric starter, and without taking additional electrical input power.

According to the invention, the electric machine added in relation to the devices according to the prior art has a reduced size, due to its low electric power of the order of 15% of the overall power of the turbomachine.

The epicyclic train reducer according to the invention comprises two inputs and one output. This reducer enables to combine the powers of the two inputs and to transmit these powers to the output. This reducer also enables to increase the torque and to vary the speed of the output.

The distribution of the constant input power between the two inputs of the epicyclic train reducer enables to adjust two speed reduction ratios between the electric starter and the shaft of the turbomachine in a discontinuous manner while maintaining the torque ratio between the electric starter and the shaft of the turbomachine.

For each operating point, the variation of the speed reduction ratio is obtained by two operating modes of the differential: one operating as a reducer with a fixed ring gear without driving the electric machine and the other with a driving of the electric machine. In these two modes of operation the driving of the speed of the electric machine is required, as well as the driving of its torque.

It is important to note that a differential allows the output speed to be modulated according to an input speed from the driving of the speed of the third component, i.e. the electric machine. On the other hand, a differential does not enable to modulate the torque ratio between the output shaft and the input shaft, which is fixed whatever the value of the speed driven by the electric machine.

In the first operating mode, as the ring gear is fixed, the speed ratio between the input and the output corresponds to the torque ratio between the input and the output.

In the second operating mode, despite a fixed torque ratio between the input and the output, the speed ratio between the input and the output is modulated by the speed of the electric machine.

In order to achieve the output torque at the turbomachine, the torque of the electric machine must be driven according to the output torque ratio.

With the driving of the speed of the starter, the distribution of the input power between the starter and the electric machine is determined.

This reducer can be used in a turbomachine with a combustion engine and an electric motor, i.e. a hybrid turbomachine.

The power distribution device according to the invention also makes it possible to solve the problems related to the phenomenon of bowed rotor and engine washing, which are significant limitations at the turbomachine.

In fact, the high-pressure shaft of the turbomachine is driven continuously at low speed, which makes it possible to guarantee homogeneous exposure to the thermal gradient, and thus to counter the tendency of the high-pressure shaft to bow. The power distribution device according to the invention thus makes it possible to reduce the downtime on the ground of the turbomachine of the aircraft.

In addition, the continuous low-speed drive of the high pressure shaft with high torque can be carried out during a water ingestion phase during an engine washing procedure. The power distribution device according to the invention thus makes it possible to increase the service life of the engine of the turbomachine.

In addition, a power distribution device according to the invention incorporates an electric starter, unlike devices according to prior art which incorporate a pneumatic starter, thereby improving the accuracy of control of the speed.

Advantageously, the device according to the invention allows a significant reduction in the size of the electric starter.

In addition, it is possible to integrate this device into a starter-generator architecture with differential and electric power transfer.

It is also possible to use the electric machine for other functions during the starting phase or after the starting phase.

Moreover, this device allows to eliminate a starting valve and the whole pneumatic circuit that feeds the air turbine, present in the devices according to the prior art.

The device according to the invention makes advantageous use of the epicyclic train reducer of the air turbine of the electric starter according to the prior art. There is therefore no addition of a differential in the device according to the invention.

The electric machine can be an electric motor. An electric motor is a device configured to convert electrical energy into mechanical energy.

The device according to the invention may comprise at least one inverter arranged upstream of the electric starter and the electric machine. An inverter is a device configured to generate an alternating current from a direct current.

According to a first embodiment, the first of said three elements is the planet carrier, the second of said three elements is the sun gear, and the third of said three elements is the ring gear.

According to a second embodiment, the first of said three elements is the planet carrier, the second of said three elements is the ring gear, and the third of said three elements is the sun gear.

The invention also relates to a turbomachine of an aircraft comprising a shaft and a device according to the invention, and in which the first of said three elements is coupled to the shaft.

The shaft may be a high pressure shaft.

The invention also relates to a method of regulating the speed of an electric machine of a power distribution device according to the invention in a turbomachine of an aircraft, comprising a step of modifying the speed of the third of the three elements by driving the electric machine by controlling means so as to obtain two bearings of reduction ratios of the speeds between the first of said three elements and the second of said three elements, and a step of driving the torque of the third of said three elements as a function of a determined output torque.

BRIEF DESCRIPTION OF THE FIGURES

The present invention shall be better understood and other details, characteristics and advantages of the present invention shall appear more clearly on reading the description of a non-limiting example which follows, with reference to the annexed drawings on which.

The elements having the same functions in the different implementations have the same references in the figures.

DETAILED DESCRIPTION OF THE INVENTION

Figure 1:
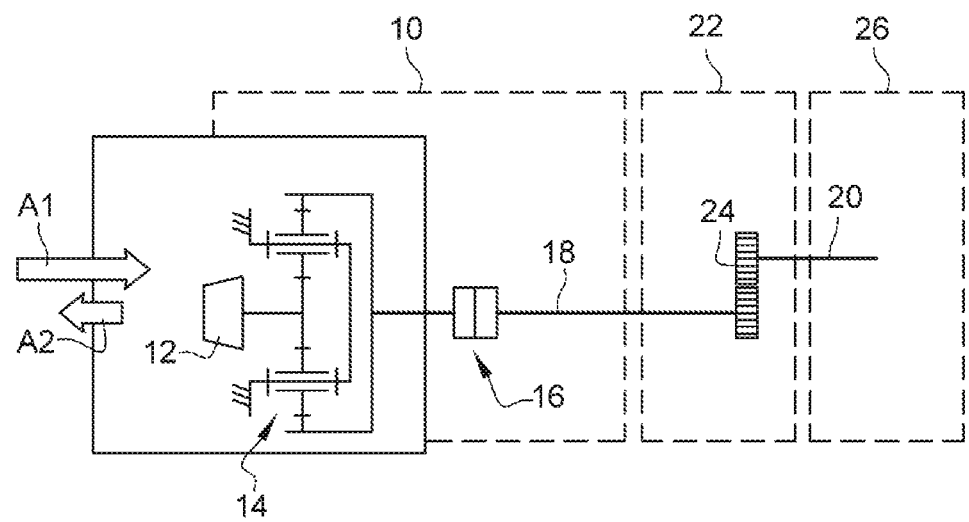
FIG. 1 represents very schematically a pneumatic starter of a turbomachine according to the prior art.
Figure 2:
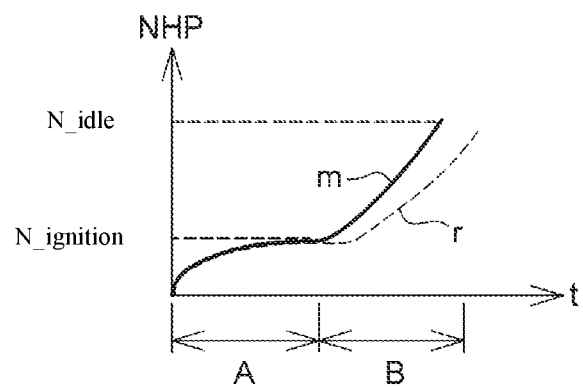
FIG. 2 represents a graph of the speed of a high-pressure shaft of a turbomachine as a function of time for a turbomachine according to the prior art.
Figure 3:
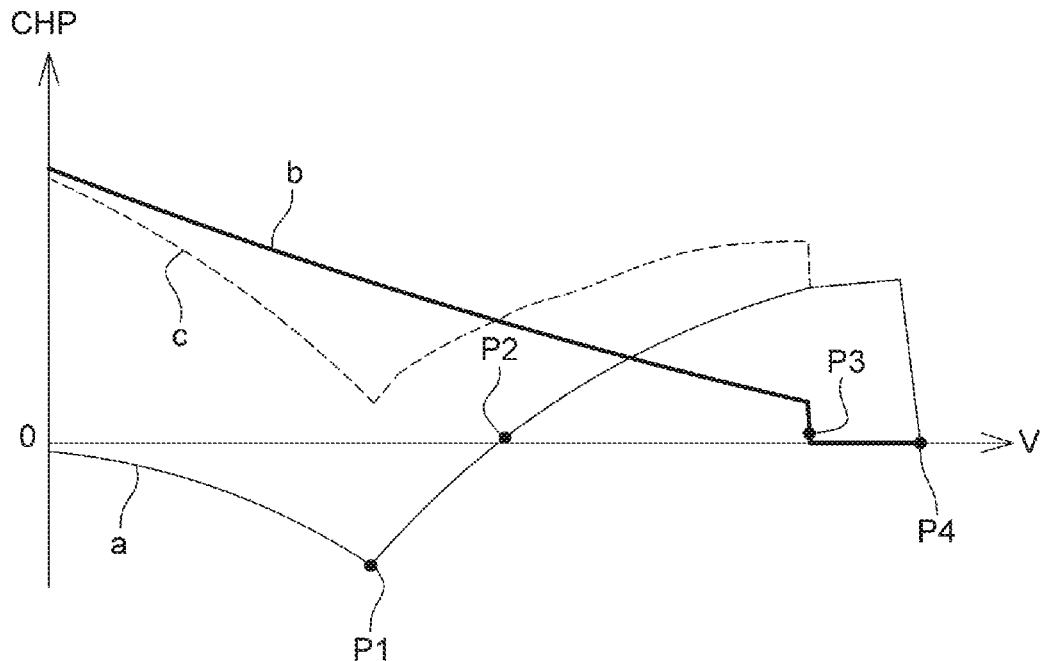
FIG. 3 represents a graph of the torques on a high-pressure shaft as a function of the rotational speed of the high-pressure shaft during a starting for a turbomachine according to the prior art.
Figure 4:
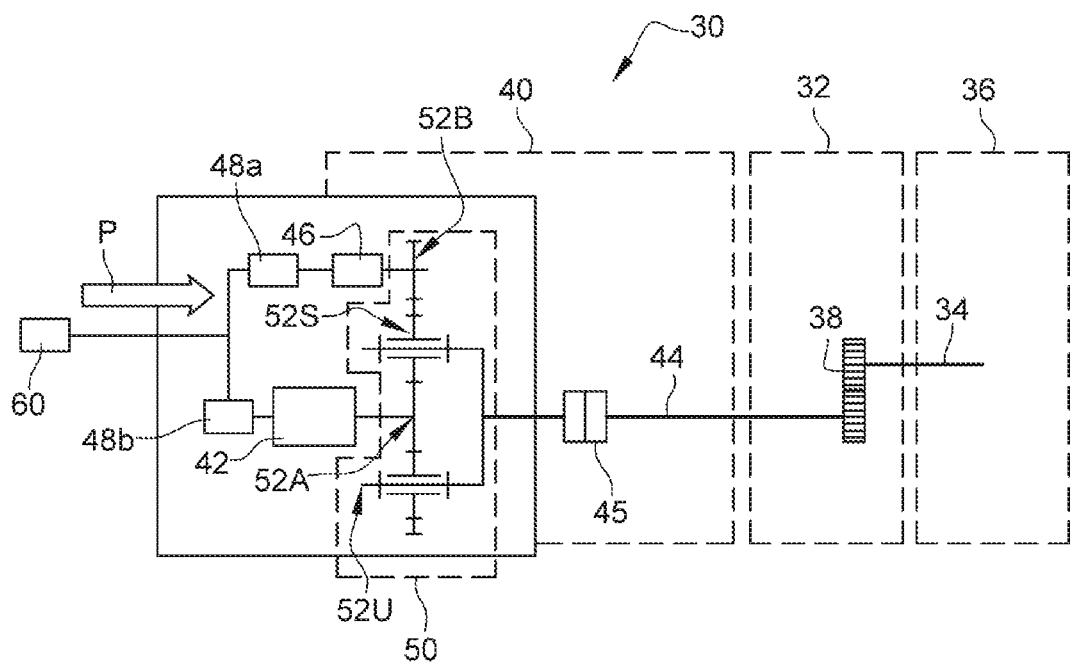
FIG. 4 represents a very schematic representation of a part of a turbomachine comprising a power distribution device according to the invention.

FIG. 4 shows a part of a turbomachine 30 comprising a power distribution device 40.

The turbomachine 30 comprises an accessory gear box 32 which is configured to be driven by an engine shaft. The accessory gear box 32 may comprise multiple gear trains connected to output shafts to drive various equipment.

The turbomachine 30 also comprises an engine 36 with a high-pressure shaft 34.

The power distribution device 40 comprises an electric starter 42. An electric starter is a device intended to assist in starting the turbomachine. The electric starter provides electrical energy to drive the turbomachine during the starting phases. The operation of an electric starter is self-sustaining, but the electric starter generally cannot start itself, unlike an electric motor.

The electric starter 42 has a mass, noted M, and is characterized by a maximum torque, noted Cmax.

The shaft 44 of the electric starter 42 is connected to the high-pressure shaft 34 of the engine 36 of the turbomachine 30 via the accessory gear box 32, and in particular via gears 38 of the accessory gear box 32. The electric starter 42 comprises a clutch 45 configured to disengage the shaft 44 of the starter from the engine 36 of the turbomachine 30 beyond a certain high-pressure rpm.

The accessory gear box 32 generally makes the connection between the engine shaft and the electric starter 42, which can be used to drive the turbomachine during starting phases or to generate an electric current when the turbomachine is started.

Turbomachine 30 also comprises an electric machine 46. The electric machine 46 can be an electric motor. An electric motor is a device for converting an electrical energy into mechanical energy. The electric machine 46 can be of low power.

The input power, represented by the arrow P, is divided between the electric machine 46 and the starter 42.

The turbomachine 30 may comprises at least one power electronics element, e.g. an inverter, arranged upstream of the electric starter 42 and the electric machine 46. For example, in FIG. 4, an inverter 48a receives part of the input power P and transfers it to the electric machine 46, and an inverter 48b receives the other part of the input power P and transfers it to the electric starter 42.

The turbomachine 30 may comprise an electrical source 60 configured to supply power to the power electronics element, e.g. inverters 48a, 48b, and thus the electric machine 46 and the electric starter 42. The electric source 60 may be the aircraft electrical system or a dedicated battery.

The turbomachine 30 also comprises means for controlling the speed of the electric machine.

The turbomachine 30 also comprises an epicyclic gear train reducer 50. The properties of the epicyclic train reducer 50 are used to adapt the torque between the starter 42 and the high pressure shaft 34.

Figure 5A:
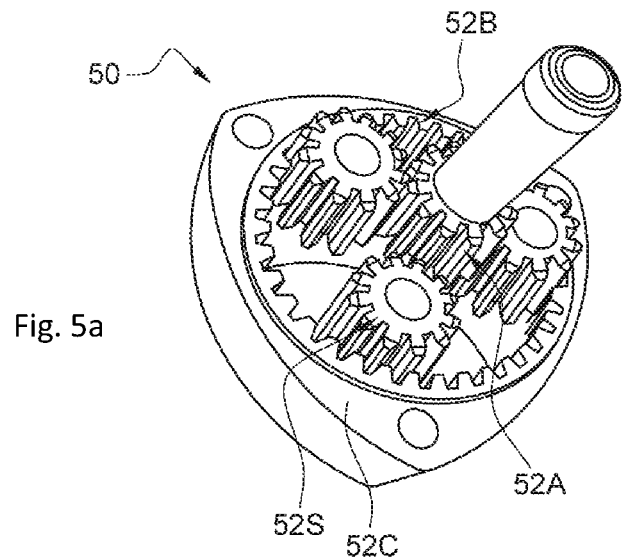
FIGS. 5a, 5b and 5c represent exploded views and a diagram of a epicyclic train reducer of a power distribution device according to the invention.
Figure 5B:
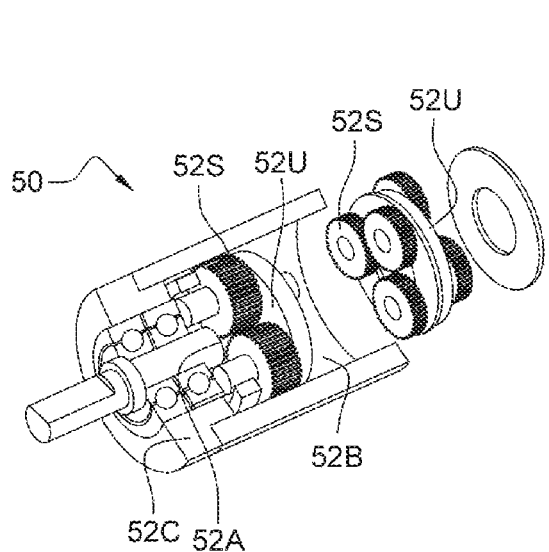
Figure 5C:
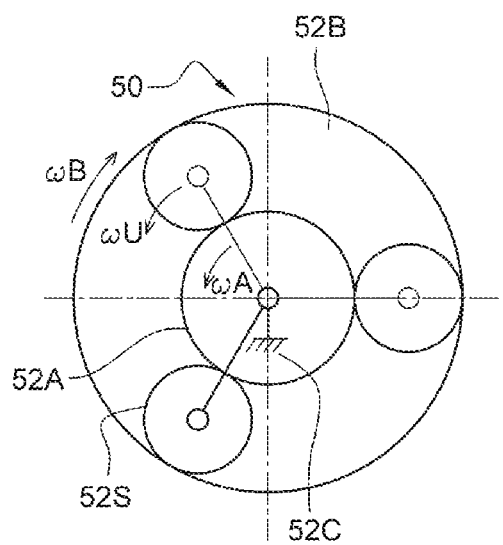

The FIGS. 5a, 5b and 5c show an epicyclic gear train reducer 50.

The epicyclic train reducer 50 comprises a sun gear 52A, also called an internal sun gear, arranged to rotate about the axis of the reducer at a rotational speed, noted ωA, and a planet carrier 52U arranged to rotate about the axis of the reducer at a rotational speed, noted ωU.

The epicyclic train reducer 50 also comprises planet gears 52S which mesh with the central sun gear 52A and are carried by a planet carrier 52U.

The epicyclic train reducer 50 also comprises an outer ring gear 52B, also known as an outer sun gear, which is arranged to rotate about the axis of the reducer at a rotational speed, noted ωB, and with which the planet gears 52S also mesh.

In the epicyclic train reducer 50, the three elements, namely the central sun gear 52A, the planet carrier 52U and the ring gear 52B, are rotatable about the axis of the reducer. For example, the ring gear 52B is free to rotate inside a fixed housing 52C which is configured to protect the reducer 50.

The operation of epicyclic train reducer 50 is governed by the Willis formula. It is a two-degree-of-freedom mechanism, in which the knowledge of the rotational speeds of two elements among the central sun gear 52A, the planet carrier 52U and the ring gear 52B, allows the calculation of the rotational speed of the third element.

The Willis formula is expressed by the following equations:

$$\frac{\omega B - \omega U}{\omega A - \omega U} = k \quad [\text{Math 2}]$$

with ωA the rotational speed of the central sun gear 52A, ωU the rotational speed of the planet carrier 52U, ωB the rotational speed of the ring gear 52B, and the factor k, also called the ratio, a constant determined by the geometry of the gears.

For the reducer in FIG. 5, the factor k complies with the following equation:

$$k = (-1)^p \frac{\prod_i Z_i}{\prod_j Z_j} \quad [\text{Math 3}]$$

where p is the number of external contacts with the gears, $\prod_i Z_i$ is the product of the number of teeth of the gears that drive, $\prod_j Z_j$ is the product of the number of teeth of the gears that are driven, $Z_i$ is the number of teeth of the gears that drive and $Z_j$ is the number of teeth of the gears that are driven. The factor k is therefore negative with a modulus of less than 1.

The high pressure shaft 34 is coupled to one of the three elements of the reducer 50, the starter 42 is coupled to a second element of the reducer 50, and the electric machine 46 is coupled to the third element of the reducer 50 to drive the rotational speed of the latter.

The accessory gear box 12 can be coupled to the first of the three elements of reduction box 50, the accessory gear box 12 being connected to the high pressure shaft 34.

In order to obtain a variation of the rotation speed of the reduction ratio of the torque between the starter and the high pressure shaft, at a constant input power between the starter and the electric machine, the rotation speed of the third element of the reducer 50 can be varied.

According to the invention, the controlling means are configured to rotate the third of said three elements so as to change the speed reduction ratio between the first of said three elements and the second of said three elements, i.e. to obtain two reduction ratio bearings of the speeds between the first of said three elements and the second of said three elements.

In other words, the controlling means are configured to drive the electric machine 46 so as to obtain two reduction ratio bearings of the speeds between the starter 42 and the high pressure shaft 34.

For example, the controlling means can be configured to drive the electric machine 46 so as to obtain two reduction ratio bearings of the speeds between the starter 42 and the accessory gear box 12, the latter being connected to the high pressure shaft 34.

Six kinematic combinations are possible for positioning the three pieces of equipment, namely the high pressure shaft 34, the electric machine 46 and the starter 42, in relation to the three elements of the epicyclic train reducer 50.

The combinations are listed in the table below. This table also shows the gear train ratio k as a function of rotation speeds ωA, ωB, ωU of the corresponding elements of the epicyclic train reducer 50 in the configuration.

TABLE 1

| | | | Ratio of the epicyclic gear |
|---|---|---|---|
| Starter 42 connected to the planet carrier 52U | | | |
| 1A | Electric machine 46 connected to the ring gear 52B | High pressure shaft 34 connected to the sun gear 52A | $\frac{\omega A}{\omega U} = 1 - k$ |
| 1B | Electric machine 46 connected to the sun gear 52A | High pressure shaft 34 connected to the ring gear 52B | $\frac{\omega B}{\omega U} = \frac{k-1}{k}$ |
| Starter 42 connected to the ring gear 52B | | | |
| 2A | Electric machine 46 connected to the planet carrier 52U | High pressure shaft 34 connected to sun gear 52A | $\frac{\omega A}{\omega B} = k$ |
| 2B | Electric machine 46 connected to the sun gear 52A | High pressure shaft 34 connected to the planet carrier 52U | $\frac{\omega U}{\omega B} = -\frac{k}{1-k}$ |
| Starter 42 connected to the sun gear 52A | | | |
| 3A | Electric machine 46 connected to the ring gear 52B | High pressure shaft 34 connected to the planet carrier 52U | $\frac{\omega U}{\omega A} = \frac{-1}{k-1}$ |
| 3B | Electric machine 46 connected to the planet carrier 52U | High pressure shaft 34 connected to the ring gear 52B | $\frac{\omega B}{\omega A} = \frac{1}{k}$ |

The torques delivered by the high-pressure shaft 34, the electric machine 46 and the starter 42 are connected by a balance expression of the gear.

In particular, a study of the reducer 50 gives the following balance relationship of the train and power balance relationship:

$$CA + CB + CU = 0 \quad [\text{Math 4}]$$

$$\omega A \times CA + \omega B \times CB + \omega U \times CU = 0 \quad [\text{Math 5}]$$

with CA the torque acting on the sun gear 52A, CB the torque acting on the ring gear 52B, CU the torque acting on the planet carrier 52U, ωA the rotational speed of the central sun gear 52A, ωB the rotational speed of the ring gear 52B and ωU the rotational speed of the planet carrier 52U.

Figure 6A:
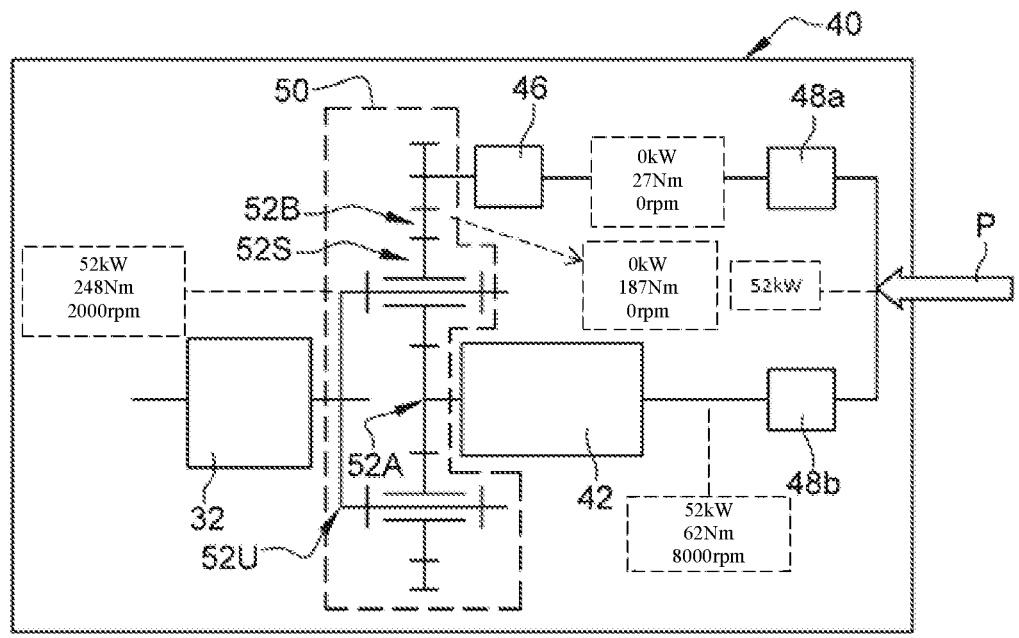
FIGS. 6a and 6b very schematically represent a power distribution device according to a first embodiment of the invention.
Figure 6B:
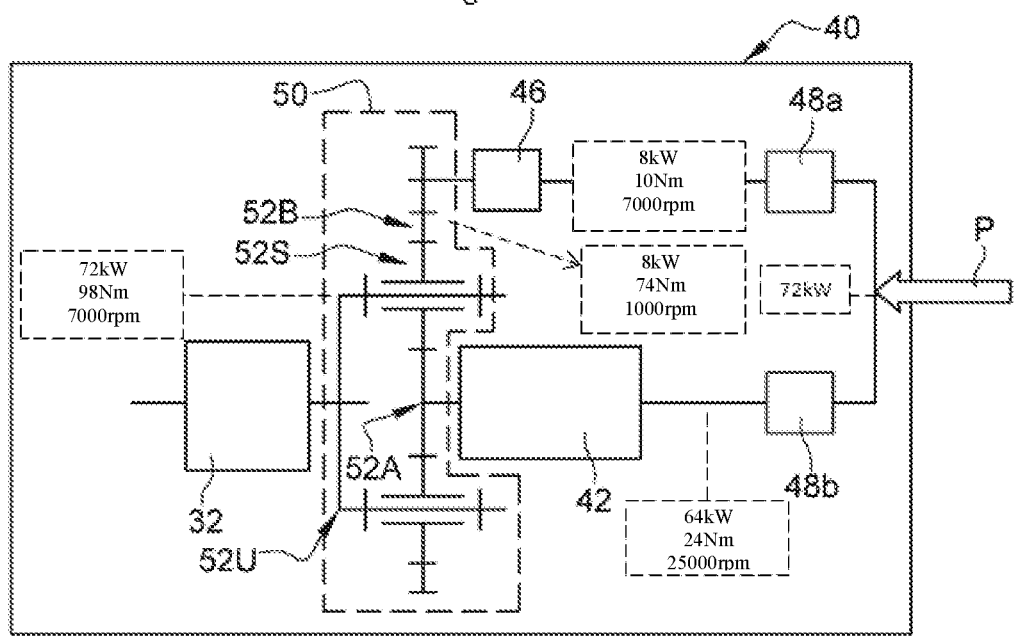

The FIGS. 6a and 6b show the configuration 3A in which the high pressure shaft 34, and thus the accessory gear box 32, is connected to the planet carrier 52U, the electric starter 42 is connected to the sun gear 52A, and the electric machine 46 is connected to the ring gear 52B.

Figure 7:
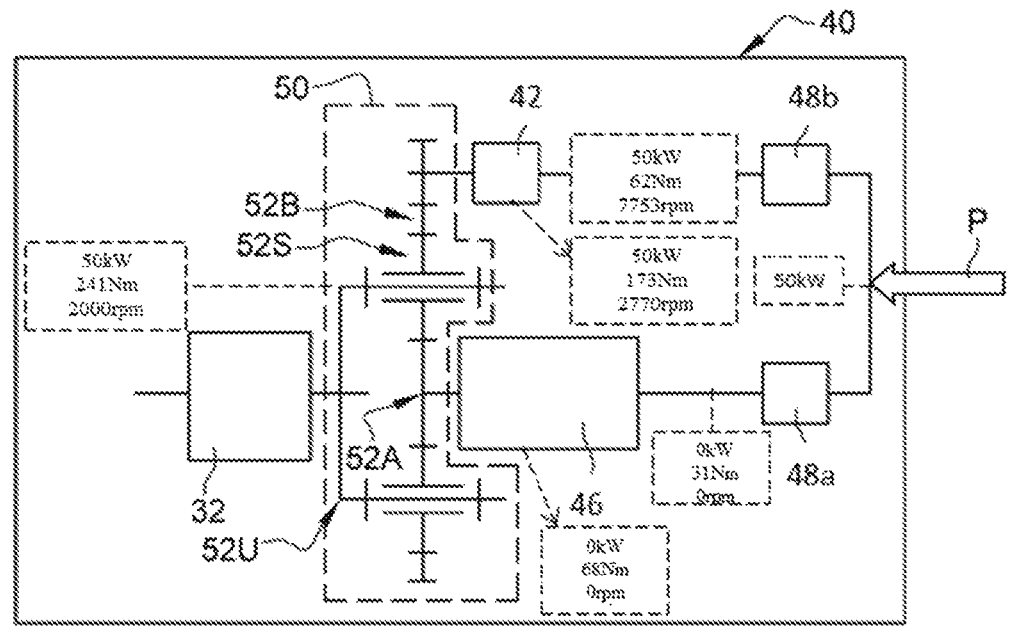
FIG. 7 very schematically represents a power distribution device according to a second embodiment of the invention.

The FIG. 7 shows the configuration 2B in which the high pressure shaft 34 is connected to the planet carrier 52U, the electric starter 42 is connected to the ring gear 52B, and the electric machine is connected to the sun gear 52A.

The configuration 3A allows to minimize the maximum torque of the electric machine 46, but requires the electric machine 46 to operate at a higher maximum speed than with the configuration 2B.

Figure 8:
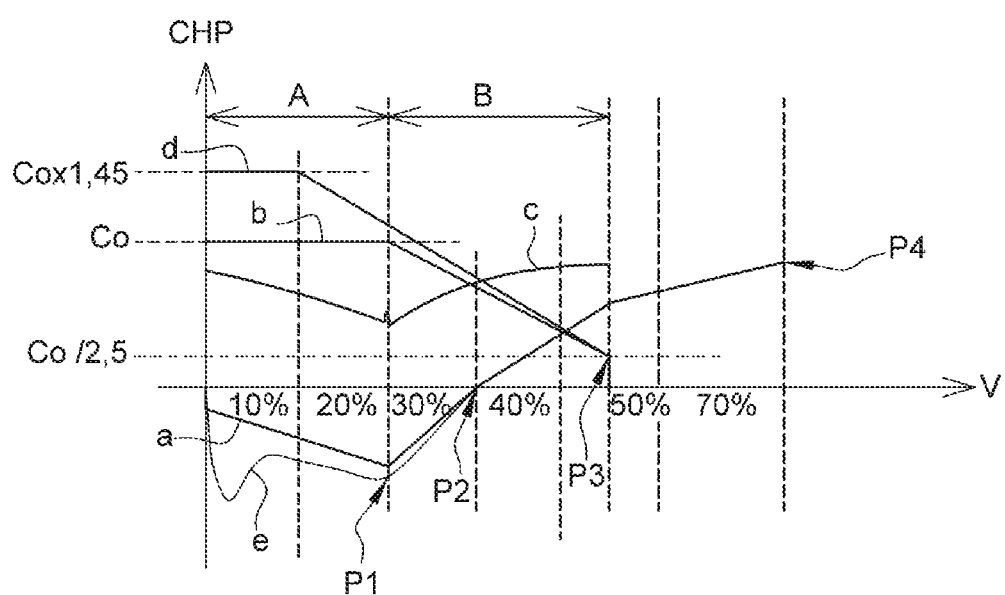
FIG. 8 represents a graph of the torques on a high-pressure shaft of a turbomachine as a function of the speed for a turbomachine according to the prior art.

According to the prior art, i.e. without a power distribution device, with a reduction ratio K, for example equal to 2.8, between the starter and the high-pressure shaft of the turbomachine, a starter of mass M and torque Cdnnax with an input power, noted Pmax, is capable of developing at the high-pressure shaft of the turbomachine a maximum torque, noted Co, equal to Cdnnax*K, with the torque profile as a function of speed shown in FIG. 8.

The FIG. 8 shows a graph of the torques on a high pressure shaft, noted CHP, of a turbomachine as a function of the speed of the high pressure shaft, noted v. On this graph, curves a and e represent the resistive torque, i.e. the sum of the Cmot and Caccess torques, respectively at ambient temperature, e.g. 20° C., and at low temperature, e.g. −40° C.; the curve c represents the inertial torque, i.e. the torque unbalance; the curves b and d represent the torque to be delivered by the starter, respectively at ambient temperature and low temperature. On this graph, the point P1 indicates ignition of the engine, the point P2 indicates the autonomy of the turbomachine, the point P3 indicates the starter cut-off and the point P4 indicates engine rpm at idle. In the FIG. 8, the area A corresponds to the period of time when only the starter is running; and the area B corresponds to the period of time when the starter and the engine are running at the same time.

With this profile, the input power, represented by the curve b, is increasing and becomes constant from the ignition, i.e. after the point P1. This profile corresponds to the requirements of the turbomachine at ambient temperature. The low-temperature torque profile, represented by the curve d, requires a higher maximum torque at the beginning of the starting which is Cdnnax*K*1.45 up to approx. 10% of the maximum speed of the turbomachine.

With the power distribution device according to the invention, for each speed of the output shaft of the turbomachine, the electrical power is distributed between the electric starter and the electric machine in order to develop the maximum torque at the shaft of the turbomachine.

Figure 9:
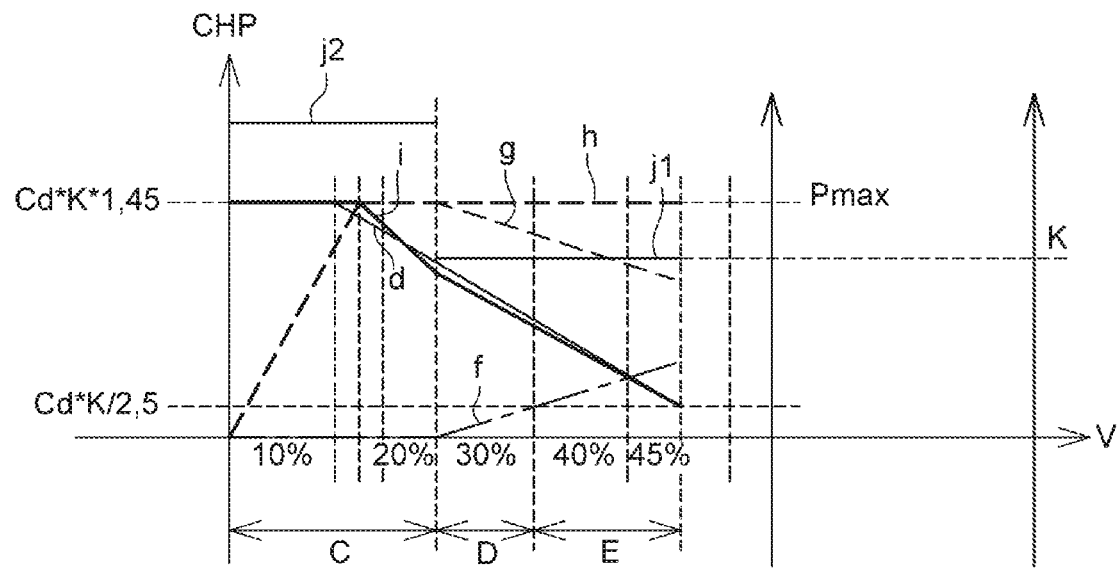
FIG. 9 represents a graph of the torques on a high pressure shaft of a turbomachine as a function of the speed for a turbomachine according to the invention.
Figure 10A:
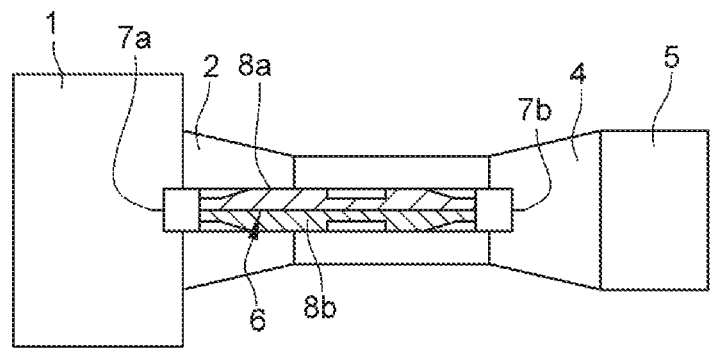
FIGS. 10a and 10b represent very schematically a turbomachine of an aircraft in which the bowed rotor phenomenon occurs.
Figure 10B:
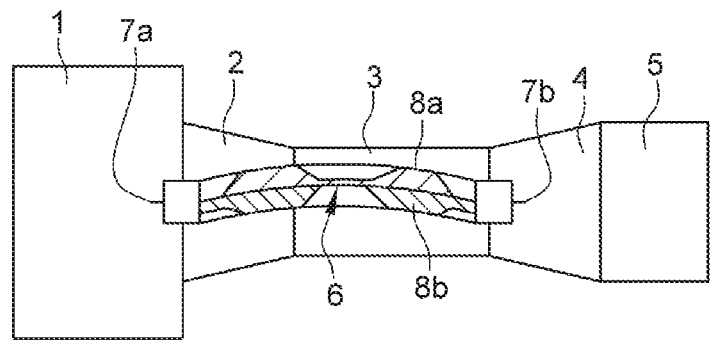

The FIG. 9 shows a graph of the torque on the high-pressure shaft, noted CHP, of the turbomachine as a function of the speed of the high-pressure shaft, noted v. On this graph, the curve d represents the torque to be delivered by the starter at low temperature; the curve f represents the power of the engine; the curve g represents the starter power; the curve h represents the resulting power curve; the curve i represents the curve of the resulting torque; and the lines j1 and j2 represent the reduction ratio K between the high-pressure shaft and the starter. In the FIG. 9, the area C corresponds to a phase where the starter is active and the engine is passive with a power of 0 kW. The zone D corresponds to a phase where the starter is active with a power less than 62 kW and where the engine is active with a power less than 10 kW. The zone E corresponds to a phase where the starter is active with a power less than 50 kW and where the engine is active with a power less than 15 kW to 20 kW. In this graph the maximum power Pmax is equal to 72 kW.

The torque ratio passes from a value K1 equal to 2.8 (line j1) at high speed to a value K2 equal to 4 (line j2) at low speed from the ignition, i.e. at 20% of the maximum speed of the turbomachine.

This increase in the torque ratio K2/K1 of 1.4 at low rpm makes it possible to reach the maximum torque required at low temperature at the beginning of the starting. This maximum torque can be maintained up to about 15% of the maximum speed of the turbomachine. The maximum power is therefore taken from 15% of the maximum speed of the turbomachine. This maximum power is then distributed between the starter and the electric machine from this speed of 15% to 100% of the speed of the turbomachine in order to maintain the reduction ratio K1 so as not to exceed the maximum speed of the starter.

In the FIG. 9, there is a phase at ratio K2 with zero electric power to the electric machine at zero speed and electric power powering the starter; and a phase at ratio K1 with maximum power distributed between the starter and the electric machine.

For the device in the FIG. 6, at 10% of the speed, i.e. at 2000 rpm, with a torque of 248 Nm, the input power is 52 kW. The reduction ratio K2 is equal to 4.

The power received by the electric machine 46 is 0 kW. The torque transmitted by electric machine 46 is 27 Nm, and its speed is therefore 0 rpm.

The power transmitted by the ring gear 52B is 0 kW. The reduction ratio KB of the ring gear 52B is 7. The torque transmitted by the ring gear 52B is 187 Nm, so its speed is 0 rpm.

The power received by the electric starter 42 is 52 kW. The torque transmitted by the electric starter 42 is 62 Nm, and its rotational speed is 8000 rpm.

The power transmitted to the high-pressure shaft 34 is 52 kW. The torque transmitted to the high-pressure shaft 34 is 248 Nm, and its rotational speed is 2000 rpm.

For the device in the FIG. 6, at 35% of the speed, i.e. at 7000 rpm, with a torque of 98 Nm, the input power is 72 kW. The reduction ratio K2 is equal to 2.8.

The power received by the electric machine 46 is 8 kW. The torque transmitted by the electric machine 46 is 10 Nm, and its rotational speed is 7000 rpm.

The power transmitted by the ring gear 52B is 8 kW. The reduction ratio KB of the ring gear 52B is 7. The torque transmitted by the ring gear 52B is 74 Nm, and its rotational speed is 1000 rpm.

The power received by the electric starter 42 is 64 kW. The torque transmitted by the electric starter 42 is 24 Nm, and its rotational speed is 25000 rpm.

The power transmitted to the high pressure shaft 34 is 72 kW. The torque transmitted to the high-pressure shaft 34 is 98 Nm, and its rotational speed is 7000 rpm.

For the device in the FIG. 7, at 10% of the speed, i.e. at 2000 rpm, with a torque of 241 Nm, the input power is 50 kW. The reduction ratio K1 is equal to 2.2 and the reduction ratio K2 is equal to 2.8.

The power received by the electric machine 46 is 0 kW. The torque transmitted by the electric machine 46 is 31 Nm, so its speed is 0 rpm.

The power transmitted by the planetary gear 52A is 0 kW. The torque transmitted by the planetary gear 52A is 68 Nm, so its rotational speed is 0 rpm.

The power received by the electric starter 42 is 50 kW. The torque transmitted by electric starter 42 is 62 Nm, and its rotational speed is 7753 rpm.

The power transmitted by the ring gear 52B is 50 kW. The torque transmitted by ring gear 52B is 173 Nm, and its rotational speed is 2770 rpm.

The power transmitted to high-pressure shaft 34 is 50 kW. The torque transmitted to the high-pressure shaft 34 is 241 Nm, and its rotational speed is 2000 rpm.

The invention also relates to a method of regulating the speed of an electric machine 46 of a turbomachine 30 as described above.

The method comprises a step of changing the speed of the third of the three elements by driving the electric machine 46 by means of the controlling means so as to modulate the speed reduction ratio between the first of said three elements and the second of said three elements in a discontinuous manner. Specifically, the method comprises a step of changing the speed of the third of the three elements by driving the electric machine 46 by means of the controlling means so as to obtain two bearings of reduction ratios of the speeds between the first of said three elements and the second of said three elements.

In particular, the speed of the electric machine 46 is adapted so that the speed reduction ratio between the starter 42 and the high pressure shaft 34 varies in a discontinuous manner. Preferably, the speed of the electric machine 46 is adapted so that the speed reduction ratio between the starter 42 and the high-pressure shaft 34 is high at low rpm and is low at high rpm of the turbomachine 30.

The method comprises a step of driving the torque of the third of said three elements as a function of a determined output torque, i.e. the output torque to be achieved.

The invention claimed is:

1. A power distribution device between an electric starter of a turbomachine and an electric machine toward a high pressure shaft of the turbomachine, comprising:
   the electric starter,
   the electric machine,
   means for controlling the speed of said electric machine,
   an epicyclic train reducer comprising three elements, a central sun gear, an outer ring gear and a planet carrier whose planet gears mesh with said sun gear and said ring gear, said three elements being rotatable about an axis of the reducer, a first of said three elements being intended to be coupled to the high pressure shaft, a second of said three elements being coupled to the electric starter, a third of said three elements being intended to be driven in rotation by the electric machine,
   wherein the controlling means are configured to rotate the third of said three elements so as to obtain two bearings of reduction ratios of the speeds between the first of said three elements and the second of said three elements,
   and wherein the controlling means are configured to drive the torque of the third of said three elements in accordance with a determined output torque.

2. The power distribution device according to claim 1, comprising at least one inverter arranged upstream of the electric starter and the electric machine.

3. The power distribution device according to claim 1, wherein the first of said three elements is the planet carrier, the second of said three elements is the sun gear, and the third of said three elements is the ring gear.

4. The power distribution device according to claim 1, wherein the first of said three elements is the planet carrier, the second of said three elements is the ring gear, and the third of said three elements is the sun gear.

5. An aircraft turbomachine comprising a shaft and a power distribution device according to claim 1, and wherein the first of said three elements is coupled to the shaft.

6. The turbomachine according to claim 5, wherein the shaft is a high pressure shaft.

7. A method of regulating the speed of an electric machine of a power distribution device, according to claim 1, in a turbomachine of an aircraft, comprising a step of modifying the speed of the third of the three elements by driving the electric machine by controlling means so as to obtain two bearings of reduction ratios of the speeds between the first of said three elements and the second of said three elements, and a step of driving the torque of the third of said three elements as a function of a determined output torque.

* * * * *